United States Patent [19]
Ohtake

[11] Patent Number: 5,534,687
[45] Date of Patent: Jul. 9, 1996

[54] FOCUS DETECTING OPTICAL SYSTEM WITH AN OFF-AXIS LIGHT SOURCE AND LIGHT PROJECTING LENS

[75] Inventor: Motoyuki Ohtake, Ohmiya, Japan

[73] Assignee: Nikon Corporation, Japan

[21] Appl. No.: 334,324

[22] Filed: Nov. 2, 1994

[30] Foreign Application Priority Data

Nov. 4, 1993 [JP] Japan ................................ 5-299020

[51] Int. Cl.[6] ................................................ G02B 7/04
[52] U.S. Cl. ............................ 250/201.4; 250/559.38; 356/4.04; 356/375; 354/403
[58] Field of Search ...................... 250/201.4, 559.38, 250/559.29; 356/4.04, 4.05, 373, 375; 354/403

[56] References Cited

U.S. PATENT DOCUMENTS

| | | | |
|---|---|---|---|
| 4,730,293 | 3/1988 | Pierce et al. | 369/44 |
| 4,907,026 | 3/1990 | Koyama et al. | 354/403 |
| 5,137,350 | 8/1992 | Misawa et al. | 356/3.03 |

FOREIGN PATENT DOCUMENTS 2-50114  2/1990  Japan.

Primary Examiner—Edward P. Westin
Assistant Examiner—Stephen Calogero

[57] ABSTRACT

In order to provide a focus detecting optical system of the active type which is capable of effecting good focus detection and enables a space to be effectively used, the focus detecting optical system of the present invention is a focus detecting optical system provided with a light projecting system for applying a beam of light emitted from a light emission source to an object through a light projecting lens. A light receiving surface condenses the reflected beam of light from the object on a light receiving element through a light receiving lens, and measures the distance to the object on the basis of a change in the imaged position on the light receiving element to thereby detect the focus position. The light emission source is positioned with eccentricity by a predetermined distance from the center of the outer diameter of the light projecting lens in a direction orthogonal to the direction of a base length. The paraxial curvature center position of at least one lens surface of the light projecting lens is positioned with eccentricity by a predetermined distance from the center of the outer diameter of the lens in the direction orthogonal to the direction of the base length.

8 Claims, 10 Drawing Sheets

FOCUS DETECTING OPTICAL SYSTEM WITH AN OFF-AXIS LIGHT SOURCE AND LIGHT PROJECTING LENS

BACKGROUND OF THE INVENTION

1. Field of the Invention

This invention relates to a focus detecting optical system, and more particularly to a focus detecting optical system of the so-called active type which is comprised of a light projecting system for applying a beam of light toward an object and a light receiving system for receiving the reflected beam of light of the applied beam of light which returns from the object.

2. Related Background Art

A focus detecting optical system of the active type has heretofore been comprised of a light projecting system for applying a beam of light emitted from a light emission source toward an object, and a light receiving system for condensing a reflected beam of light returning from the object on a light receiving element. That is, the light projecting system is comprised of a light emission source and a light projecting lens, and the light receiving system is comprised of a light receiving element and a light receiving lens. When the position of the object changes and the distance to the object changes, the position at which an image is formed on the light receiving element changes on the basis of the parallax between the light projecting system and the light receiving system. Thus, on the basis of the change in the position at which an image is formed on the light receiving element, the distance to the object can be measured (distance measurement) and a focus position on which focusing is to be effected can be detected.

FIGS. 8A and 8B of the accompanying drawings are cross-sectional views showing the optical arrangement of a focus detecting optical system of the active type according to the prior art, FIG. 8A showing a cross-sectional view in the direction of a base length, and FIG. 8B showing a cross-sectional view of a light projecting system in a direction orthogonal to the direction of the base length.

In FIGS. 8A and 8B, the light projecting system is provided with a light emission source 1 and a light projecting lens 2. In these figures, the arrow H indicates the normal direction of the light emitting surface of the light emission source 1, and the letter K indicates the optical axis of the light projecting lens 2. Thus, design is made such that a beam of light emitted from the light emission source 1 is applied toward an object 3 through the light projecting lens 2. For the convenience of the drawing sheet, the position of the object 3 is not exactly shown.

On the other hand, the light receiving system is provided with a light receiving lens 4 and a light receiving element 5. In the figures, the letter J indicates the optical axis of the light receiving lens 4, and the letter L indicates the direction of a base length (the distance between the optical axis K of the light projecting lens 2 and the optical axis J of the light receiving lens 4). Thus, design is made such that a beam of light RO reflected by the object 3 is condensed on the light receiving element 5 through the light receiving lens 4.

The center G of the outer diameter of the light projecting lens 2 is coincident with the optical axis of the light projecting lens 2.

FIG. 9 of the accompanying drawings shows the optical path of the beam of light emitted from the light emission source 1 in the prior-art light projecting system of FIGS. 8A and 8B. In FIG. 9, the letter B indicates the paraxial image plane position of the light emission source 1 by the light projecting lens 2, the letter A indicates a farther position than B, and the letter C indicates a shorter distance position than B. It is to be understood here that the light projecting lens has its spherical aberration sufficiently corrected and the light emission source 1 can be regarded as a point light source.

FIGS. 10A to 10C of the accompanying drawings show the light intensity distributions in the direction of the base length at the positions A, B and C, respectively, of FIG. 9. In these figures, the axis of ordinates represents the light intensity and the axis of abscissas represents a direction corresponding to the direction of the base length.

Generally, in a single lens, the axis linking the centers of the paraxial curvatures of two lens surfaces is called the lens optical axis, and the center axis of the outer diameter shape of the lens is called the center of the outer diameter of the lens. To accurately detect the position of the object in the light receiving system, it is necessary that the centroid of the image of the light emission source projected onto the object by the light projecting system (hereinafter referred to as the "projected light spot") exist on a straight line parallel to the center of the outer diameter of the lens (actually the axis) without pending on any change in the position of the object.

Incidentally, referring to FIGS. 10A to 10C, it is seen that the centroid of the projected light spot exists on the center G of the outer diameter of the light projecting lens 2 without depending on the positions A to C.

Therefore, in the prior-art light projecting system, the center of the outer diameter of the light projecting lens and the optical axis of the lens have been made coincident with each other and the light emission source has been positioned on the optical axis of the light projecting lens. Also, the light emission source is varied in its emitted light intensity in conformity with the angle of the light emitted from the light emitting surface thereof, by directionality. Accordingly, in order to secure the quantity of light applied toward the object to its maximum, it has been necessary to make the normal to the light emitting surface of the light emission source coincident with the center of the outer diameter (and further the lens optical axis) of the light projecting lens.

Thus, in order to accurately detect the position of the object in the light receiving system, it has been necessary to make the center of the outer diameter of the light projecting lens coincident with the lens optical axis and position the light emission source on the optical axis of the light projecting lens. Also, in order to secure the quantity of light applied toward the object to its maximum, it has been necessary to make the normal to the light emitting surface of the light emission source coincident with the center of the outer diameter (and further the lens optical axis) of the light projecting lens.

That is, in the focus detecting optical system of the active type according to the prior art, there have been limitations in arrangement as described above between the light projecting lens and the light emission source. This has led to the inconvenience that in spite of an unused space being present around the light emission source, this space cannot be effectively used.

As previously described, from the limitations in the arrangement of the light emission source and the light projecting lens, a space which is not effectively used has been present around the light emission source. To use this space effectively, the following two methods would come to mind:

(a) A method of moving the position of the light emission source in a plane parallel to the light emitting surface thereof, or (b) A method of moving the optical axis of the light projecting lens and the position of the light emission source by predetermined distances relative to the center of the outer diameter of the light projecting lens.

In the case of method (a), as shown in FIG. 11 of the accompanying drawings, the distance by which the centroidal position of the projected light spot deviates from the center G of the outer diameter of the light projecting lens 2 in the direction of the base length depending on the positions A, B and C of the object varies, and this becomes a cause of inaccurate distance measurement.

In the case of method (b) (disclosed, for example, in Japanese Laid-Open Patent Application No. 2-50114), as shown in FIG. 12 of the accompanying drawings, the center G1 of the outer diameter of the light projecting lens 2 is moved upwardly by a predetermined distance along the direction L of the base length relative to the optical axis K of the light projecting lens 2 and the light emission source 1. Also, the center G4 of the outer diameter of the light receiving lens 4 is moved downwardly by a predetermined distance along the direction L of the base length relative to the optical axis J of the light receiving lens 4 and the light receiving element 5.

FIG. 13 of the accompanying drawings shows the optical path of the beam of light emitted from the light emission source 1 in the prior-art light projecting system of FIG. 12. In FIG. 13, the letter B indicates the position of the paraxial image plane of the light emission source 1 by the light projecting lens 2, the letter A indicates a farther position than B, and the letter C indicates a shorter distance position than B. It is to be understood here that the light projecting lens 2 has its spherical aberration sufficiently corrected and the light emission source 1 can be regarded as a point light source.

FIGS. 14A to 14C of the accompanying drawings show the light intensity distributions in the direction of the base length at the positions A, B and C, respectively, of FIG. 13. In these figures, the axis of ordinates represents the light intensity and the axis of abscissas represents a direction corresponding to the direction of the base length.

As described above, in the case of method (b), the base length can be enlarged to thereby achieve the effective use of the space. However, as shown in FIGS. 13 and 14A to 14C, the amount by which the centroidal position of the projected light spot deviates in the direction of the base length from the center G of the outer diameter of the light projecting lens 2 depending on the positions A, B and C of the object varies, and this becomes a cause of inaccurate distance measurement.

Further, the light emission source 1 is positioned on the optical axis K of the light projecting lens 2 and the normal direction H of the light emitting surface of the light emission source 1 is coincident with the optical axis K of the light projecting lens 2. Accordingly, as is apparent from FIG. 13, by the directionality of the light emission source 1, the quantity of light applied from the light emission source 1 to the light projecting lens 2 substantially decreases relative to the quantity of light emitted from the light emission source 1.

SUMMARY OF THE INVENTION

The present invention has as its object the provision of a focus detecting optical system of the active type which can effect good focus detection and enables a space to be effectively used.

The present invention provides a focus detecting optical system provided with a light projecting system for applying a beam of light emitted from a light emission source to an object through a light projecting lens, and a light receiving system for condensing the reflected beam of light from said object on a light receiving element through a light receiving lens, and for measuring the distance to said object on the basis of a change in the imaged position on said light receiving element to thereby detect the focus position, characterized in that said light emission source is positioned with eccentricity by a predetermined distance in a direction from the center of the outer diameter of said light projecting lens to a direction orthogonal to the direction of a base length, and the paraxial curvature center position of at least one lens surface of said light projecting lens is positioned with eccentricity by a predetermined distance in the direction from said center of the outer diameter of the lens to the direction orthogonal to the direction of the base length so as to correct any fluctuation of the centroidal position of a projected light spot relative to said center of the outer diameter of the lens which is attributable to the eccentricity of said light emission source.

Also, according to a preferred embodiment of the present invention, the normal to the light emitting surface of said light emission source is positioned with inclination of a predetermined angle with respect to said center of the outer diameter of the lens so that the quantity of light applied from said light emission source to said light projecting lens may not be substantially small relative to the quantity of light emitted from said light emission source.

That is, in the present invention, in the focus detecting optical system of the active type, the light emission source is positioned with deviation from the center of the outer diameter of the light projecting lens in a direction perpendicular to the direction of the base length to thereby achieve the effective use of a space. Also, the curvature center position of at least one lens surface of the light projecting lens is made eccentric from the center of the outer diameter of the lens to thereby correct any fluctuation of the centroidal position of the projected light spot relative to the center of the outer diameter of the lens which is based on the deviation of the light emission source from the center of the outer diameter of the lens.

Further, the normal to the light emitting surface of the light emission source is positioned with inclination of a predetermined angle with respect to the center of the outer diameter of the lens so that the quantity of light applied from the light emission source to the light projecting lens may not substantially decrease relative to the quantity of light emitted from the light emission source.

Thus, in the focus detecting optical system of the present invention, it is possible to achieve the effective use of the space and yet obtain an excellent distance measuring performance.

In the present invention, to effect distance measurement of higher accuracy, it is desirable to make that surface of the light projecting lens which is most adjacent to the object side into an aspherical surface, and position the rotational optical axis of this aspherical surface with deviation in a direction perpendicular to the direction of the base length relative to the center of the outer diameter of the light projecting lens.

In the focus detecting optical system of the active type, as the position of the object becomes farther, the quantity of light obtained by the light receiving system decreases in proportion to the square of the distance. Therefore, to improve the distance measuring performance for an object which is at a long distance, it is necessary to make the brightness of the light projecting system and the light receiving system higher. Accordingly, it is desirable to construct the light projecting system and the light receiving system of a small number of lenses. However, when the light projecting system and the light receiving system are constructed of a small number of lenses, negative spherical aberration becomes liable to occur and therefore, if that surface of the light projecting lens which is most adjacent to the object side is formed into an aspherical surface, it will be possible to create positive spherical aberration to thereby correct the above-mentioned negative spherical aberration and obtain good distance measurement accuracy.

To correct the fluctuation of the projected light spot caused by the deviation of the light emission source, it is desirable that the position of the center of curvature of that surface of the light projecting lens which is most adjacent to the object side be deviated by a predetermined amount from the center of the outer diameter of the lens in a direction perpendicular to the direction of the base length.

In the present invention, in order to obtain a distance measuring performance of still higher accuracy, in addition to satisfying the above-described construction and conditions, it is desirable that the lens optical axis be parallel-moved and positioned in the direction perpendicular to the direction of the base length, relative to the center of the outer diameter of the light projecting lens.

Further, to effect focus detection of higher accuracy, it is desirable to satisfy the following conditional expression (1):

$$0.5 < |\tan \beta|/(|\delta|/Bf) < 2, \tag{1}$$

where

Bf: the on-axis spacing between the light emission source and that surface of the light projecting lens which is most adjacent to the light emission source;

δ: the amount of deviation of the light emission source relative to the center of the outer diameter of the light projecting lens;

β: the angle formed between the normal to the light emitting surface of the light emission source and the center of the outer diameter of the lens.

Conditional expression (1) prescribes an appropriate range about the angle β formed between the optical axis of the light projecting lens and the normal to the light emitting surface of the light emission source.

When the range of conditional expression (1) is departed from, the quantity of light applied from the light emission source to the light projecting lens will become substantially small relative to the quantity of light emitted from the light emission source and therefore, it will become difficult to effect focus detection well, and this is not preferable.

BRIEF DESCRIPTION OF THE DRAWINGS

FIG. 1A represents a cross-sectional view in the direction of a base length. FIG. 1B represents a cross-sectional view of a light projecting system in a direction orthogonal to the direction of the base length.

FIGS. 2A, 2B and 2C represents the light intensity distributions of the projected light spot when the positions of an object are 4m, 2m and 1m, respectively.

FIGS. 3A, 3B and 3C represent the light intensity distributions of the projected light spot when the positions of the object are 4m, 2m and 1m, respectively.

FIGS. 4A, 4B and 4C represent the light intensity distributions of the projected light spot when the positions of the object are 4m, 2m and 1m, respectively.

FIGS. 5A, 5B and 5C represent the light intensity distributions of the projected light spot when the positions of the object are 4m, 2m and 1m, respectively.

FIGS. 6A, 6B and 6C represent the light intensity distributions of the projected light spot when the positions of the object are 4m, 2m and 1m, respectively.

FIGS. 7A, 7B and 7C represent the light intensity distributions of the projected light spot when the positions of the object are 4m, 2m and 1m, respectively.

FIG. 8A represent a cross-sectional view in the direction of a base length, and FIG. 8B represent a cross-sectional view of a light projecting system in a direction orthogonal to the direction of the base length.

DESCRIPTION OF THE PREFERRED EMBODIMENTS

Some preferred embodiments of the present invention will hereinafter be described with reference to the accompanying drawings.

Figure 1A:
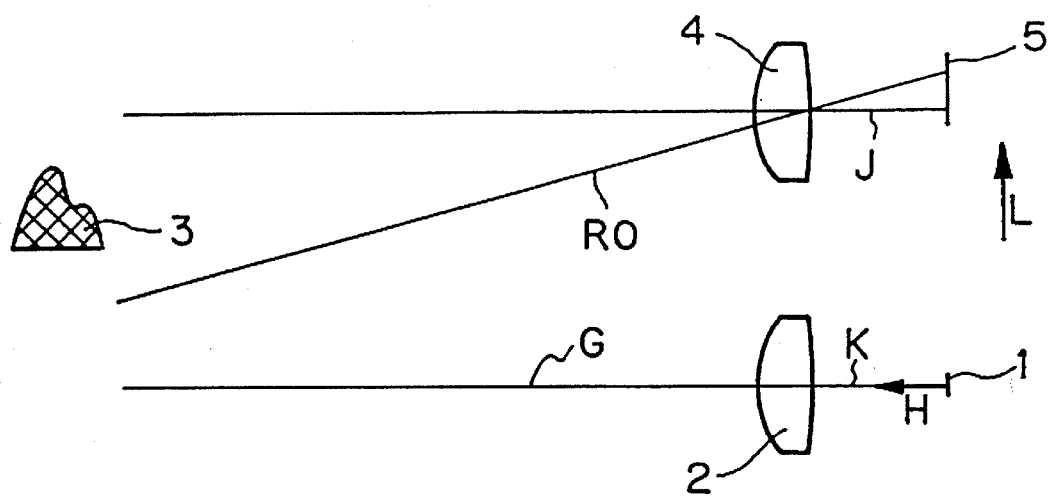
FIGS. 1A and 1B are diagrams of cross-sectional views of the optical arrangement of a focus detecting optical system according to a preferred embodiment of the present invention.
Figure 1B:
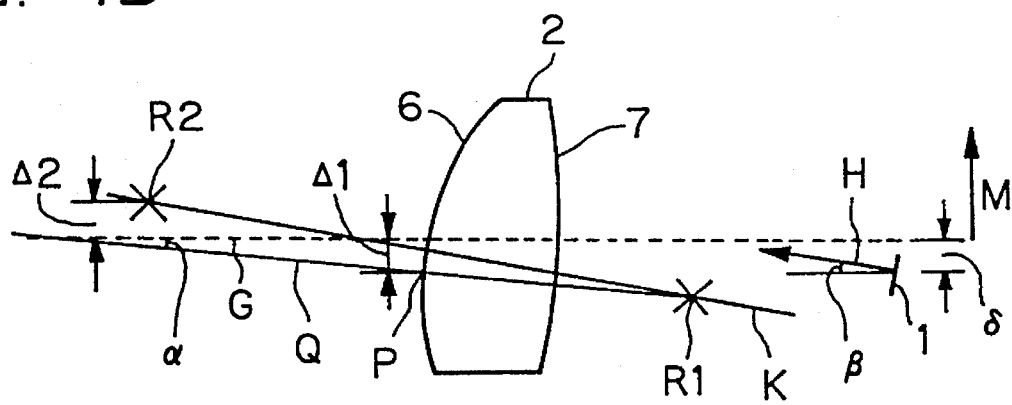

FIGS. 1A and 1B are diagrams of cross-sectional views of the optical arrangement of a focus detecting optical system according to a preferred embodiment of the present invention. FIG. 1A represents a cross-sectional view in the direction of a base length, and FIG. 1B represents a cross-sectional view of a light projecting system in a direction orthogonal to the direction of the base length.

The focus detecting optical system shown is provided with a light projecting system comprising a light emission source 1 and a light projecting lens 2. The light emission source 1 comprises, for example, an IRED (infrared ray emitting diode) emitting a beam of infrared light. In the Figure, the letter H indicates the normal direction of the light emitting surface of the light emission source 1, and the letter K indicates the optical axis of the light projecting lens 2. Thus, design is made such that the beam of light emitted from the light emission source 1 is applied toward an object 3 through the light projecting lens 2. For the convenience of the drawing sheet, the position of the object 3 is not exactly shown.

The focus detecting optical system shown is also provided with a light receiving system comprising a light receiving element 5 and a light receiving lens 4. In the figures, the letter J indicates the optical axis of the light receiving lens 4, and the arrow L indicates the direction of the base length. Thus, design is made such that a beam of light RO reflected by the object 3 is condensed on the light receiving element 5 through the light receiving lens 4.

The center G of the outer diameter of the light projecting lens and the optical axis K of the light projecting lens 2 do not deviate in the direction L of the base length.

FIG. 1B is a diagram of a cross-sectional view of the light projecting system along the direction orthogonal to the direction of the base length, and in this figure, the letter M indicates a direction perpendicular to the center G of the outer diameter of the light projecting lens 2 and the direction L of the base length (it is to be understood that the direction of arrow is positive). The object side (left in the figure) surface 6 of the light projecting lens 2 is formed into an aspherical surface.

In the figure, the letter Q indicates the rotational center axis of the aspherical surface 6, the letter α indicates the angle formed between the rotational center axis Q and the center G of the outer diameter of the lens, the letter P indicates the vertex of the object side aspherical surface 6, Δ1 indicates the amount of deviation of the vertex P from the center G of the outer diameter of the lens, R1 indicates the paraxial curvature center of the object side aspherical surface 6 of the light projecting lens 2, R2 indicates the paraxial curvature center of that surface 7 of the light projecting lens 2 which is adjacent to the light emission source 1, and Δ2 indicates the amount of deviation of the paraxial curvature center R2 from the center G of the outer diameter of the lens in the direction L.

Further, the letter δ indicates the amount of deviation of the light emission source 1 from the center G of the outer diameter of the lens in the direction M, and the letter β indicates the angle formed between the center G of the outer diameter of the light projecting lens 2 and the normal H to the light emission source 1.

The focus detecting optical system of a preferred embodiment constructed as described above operates in the following manner.

The beam of light emitted from the light emission source 1 is condensed through the light projecting lens 2 and is applied to the object 3. The beam of light reflected by the object 3 is condensed through the light receiving lens 4 and is imaged on the light receiving element 5. The imaged position of the reflected beam of light on the light receiving element 5 changes depending on the position of the object 3, i.e., the distance to the object 3. Thus, on the basis of a change in the imaged position of the reflected beam of light on the light receiving element 5, the distance to the object 3 is measured (distance measurement) and the focus position on which focusing is to be effected is detected.

Embodiment 1

In another preferred embodiment, Embodiment 1, an IRED having a light emission wavelength of 860 nm is used as the light emission source 1, and a PSD (position sensitive diode) is used as the light receiving element 5. The base length is 30 mm.

The values of the various elements of Embodiment 1 of the present invention are given in Table 1 below. In Table 1, the numbers at the left end indicates the order of respective lens surfaces from the object side, r indicates the radius of curvature of each lens surface, d indicates the spacing between adjacent lens surfaces, and n indicates the refractive index for the light emission wavelength of the light emission source 1. In the light projecting system and the light receiving system, there are shown lens data along the direction of travel of the beam of light.

When the x-axis is plotted in the direction of the optical axis (the direction of the rotation symmetry axis of the aspherical surface) and the y-axis is plotted in a direction perpendicular to the optical axis and the amount of displacement in the direction of the optical axis (the x-axis) at a height y is S(y) and the reference radius of curvature is R and the nth-order aspherical surface coefficient is Cn, the aspherical surface is represented by the following mathematical expression (2):

$$S(y) = (y^2/R) / (1 + (1 - k \cdot y^2/R^2)^{1/2}) + C_2 \cdot y^2 + C_4 \cdot y^4 + C_6 \cdot y^6 + C_8 \cdot y^8 + C_{10} \cdot y^{10} + \ldots \quad (2)$$

Also, the paraxial radius of curvature r of the aspherical surface is defined by the following mathematical expression (3):

$$r = 1/(2 \cdot C_2 + 1/R) \quad (3)$$

In the table of the various elements of each embodiment, the aspherical surface is marked with * at the right of the surface number.

TABLE 1

(Light Projecting System)

| | r | d | n | |
|---|---|---|---|---|
| 0 | ∞ | 2.17 | 1.54000 | (IRED) |
| 1 | −1.3500 | 12.33 | | |
| 2 | 95.5380 | 4.50 | 1.48423 | (light projecting lens) |
| 3* | −9.5991 | | | |

(Aspherical Surface data)

| | k | $C_2$ | $C_4$ |
|---|---|---|---|
| 3rd surface | 0.7664 | 0.0000 | $0.64823 \times 10^{-6}$ |

| | $C_6$ | $C_8$ | $C_{10}$ |
|---|---|---|---|
| | $0.26688 \times 10^{-8}$ | $0.36944 \times 10^{-10}$ | $0.29195 \times 10^{-12}$ |

(Other Dimensional Parameters)

The outer diametral shape of the light projecting
lens 2 is a cylindrical shape of a diameter 15 mm, and
$\Delta 1 = 0$
$\Delta 2 = -1.2$ mm
$\delta = -1.5$ mm
$\alpha = -1°$
$\beta = 6°$ (Light Receiving System)

| | r | d | n | |
|---|---|---|---|---|
| *1 | 8.2925 | 4.50 | 1.48423 | (light receiving lens) |
| 2 | −139.0400 | 13.80 | | |

(Aspherical Surface Data)

| | k | $C_2$ | $C_4$ |
|---|---|---|---|
| 1st surface | 0.5612 | 0.0000 | $-0.43029 \times 10^{-6}$ |

| | $C_6$ | $C_8$ | $C_{10}$ |
|---|---|---|---|
| | $-0.11284 \times 10^{-8}$ | $-0.65264 \times 10^{-10}$ | $0.72888 \times 10^{-13}$ |

(Condition-corresponding Values)

$|\tan\beta| = 0.105$
$|\delta|/Bf = 0.096$
$|\tan\beta|/(|\delta|/Bf) = 1.094$

Figure 2A:
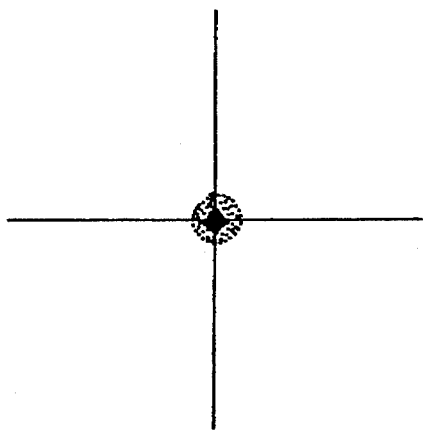
FIGS. 2A to 2C are graphs representing the light intensity distributions of a projected light spot by the light projecting system of a preferred embodiment of the present invention
Figure 2B:
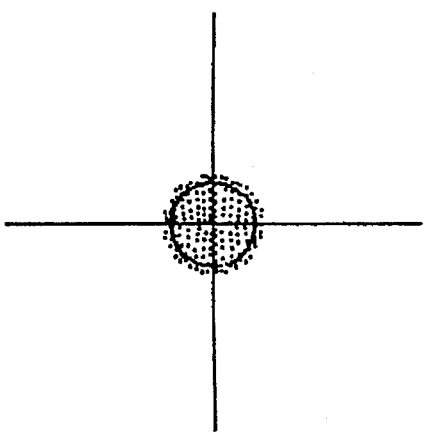
Figure 2C:
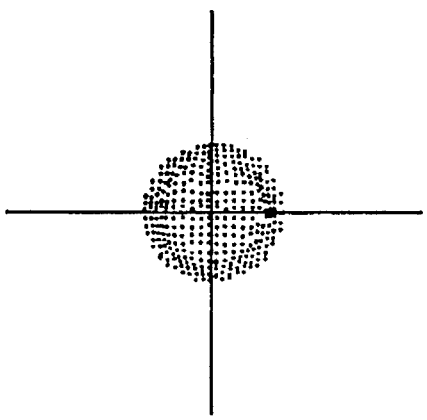

FIGS. 2A to 2C are graphs of the light intensity distributions of the projected light spot by the light projecting system of the present embodiment. FIGS. 2A, 2B and 2C represent the light intensity distributions of the projected light spot when the positions of the object are 4m, 2m and 1m, respectively.

Figure 3A:
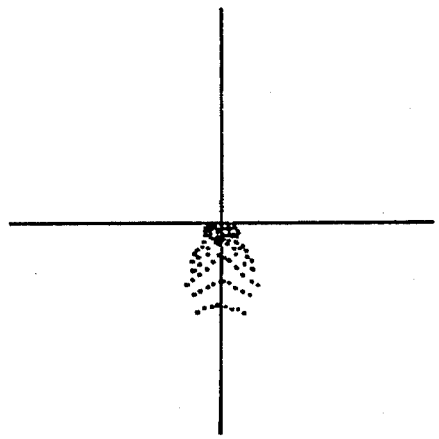
FIGS. 3A to 3C are graphs representing the light intensity distributions of a projected light spot in the light projecting system of a preferred embodiment of the present invention, when the position of a light emission source is not moved (δ=0).
Figure 3B:
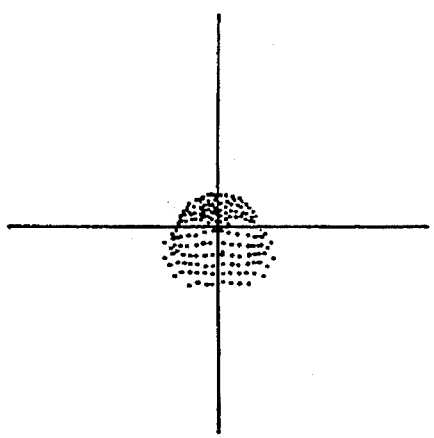
Figure 3C:
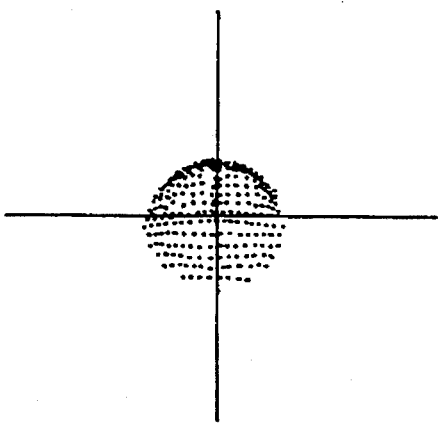

FIGS. 3A to 3C are graphs of the light intensity distributions of the projected light spot in the light projecting system of a preferred embodiment of the present invention, when the position of the light emission source is not moved ($\delta=0$). FIGS. 3A, 3B and 3C represents the light intensity distributions of the projected light spot when the positions of the object are 4m, 2m and 1m, respectively.

Figure 4A:
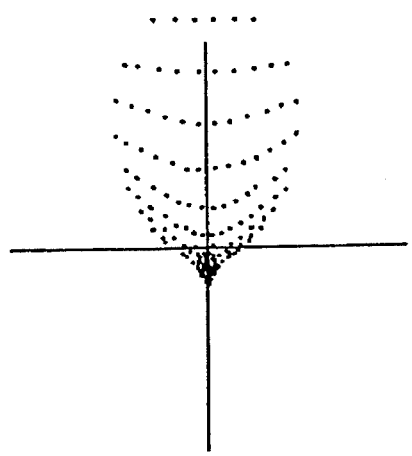
FIGS. 4A to 4C are graphs representing the light intensity distributions of a projected light spot in the light projecting system of a preferred embodiment the present invention, when the position of the light emission source is moved by a predetermined amount, but the eccentricity of the projected light spot resulting from this movement is not corrected by a light projecting lens.
Figure 4B:
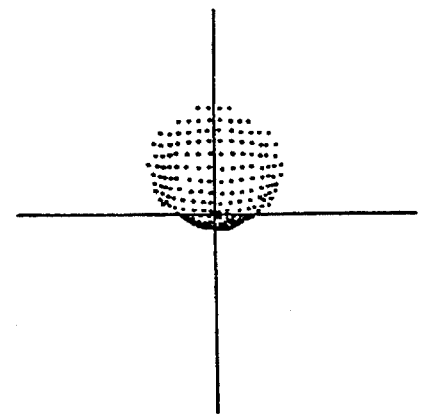
Figure 4C:
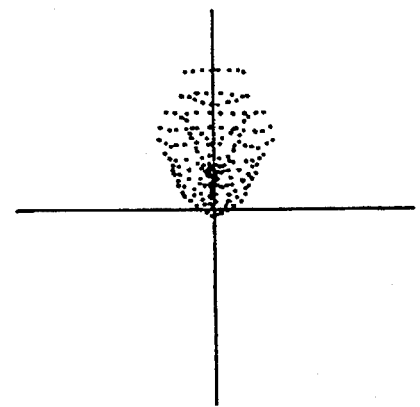

FIGS. 4A to 4C are graphs of the light intensity distributions of the projected light spot in the light projecting system of a preferred embodiment of the present invention, when the position of the light emission source is moved by a predetermined amount but the eccentricity of the projected light spot resulting from this movement is not corrected by the light projecting lens. FIGS. 4A, 4B and 4C represent the light intensity distributions of the projected light spot when the positions of the object are 4m, 2m and 1m, respectively.

In FIGS. 2A to 4C, the axis of abscissas corresponds to the direction L of the base length, and the axis of ordinates corresponds to the direction M orthogonal to the direction of the base length.

As is apparent from the comparison of FIGS. 3A to 3C and FIGS. 4A to 4C which are the results of comparative examples with FIGS. 2A to 2C which are the results of the Embodiment 1, according to the focus detecting optical system according to the present invention, the position of the light emission source is moved by a predetermined amount and the eccentricity of the projected light spot resulting from this movement is corrected by the light projecting lens and therefore, the centroidal position of the projected light spot is substantially constant relative to the object which is at a distance of 1m to 4m. Accordingly, it will be seen that distance measurement can be effected with good accuracy by the use of the focus detecting optical system according to the present invention and as a result, the focus position can be detected with good accuracy.

Embodiment 2

In yet another preferred embodiment, Embodiment 2 an IRED having a light emission wavelength of 860 nm is used as the light emission source 1, and a PSD (position sensitive diode) is used as the light receiving element 5. The base length is 28 mm.

Thus, the focus detecting optical system of the second embodiment is similar in construction to the focus detecting optical system of Embodiment 1, but differs in base length, lens data, etc. from the latter.

The values of the various elements of Embodiment 2 of the present invention are given in Table 2 below. In Table 2, the numbers at the left end indicates the order of respective lens surfaces from the object side, r indicates the radius of curvature of each lens surface, d indicates the spacing between adjacent lens surfaces, and n indicates the refractive index for the light emission wavelength of the light emission source 1. In the light projecting system and the light receiving system, there are shown lens data along the direction of travel of the beam of light.

Figure 5A:
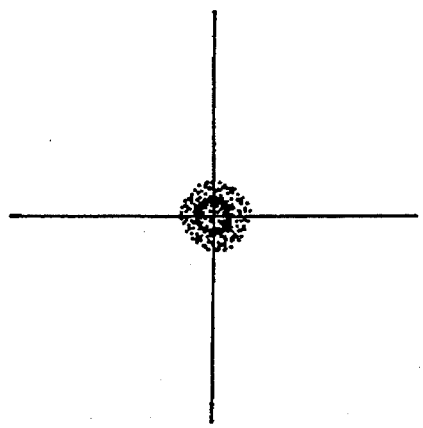
FIGS. 5A to 5C are graphs representing the light intensity distributions of the projected light spot by the light projecting system of a preferred embodiment the present invention.
Figure 5B:
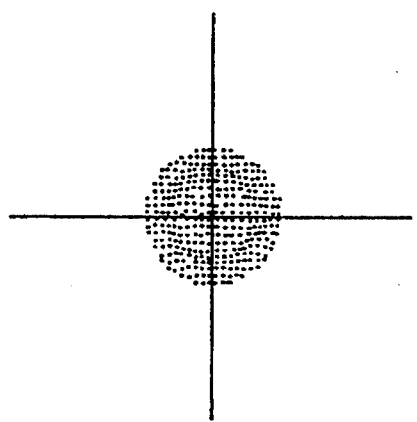
Figure 5C:
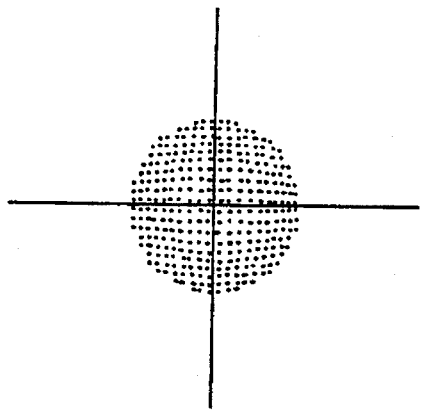

FIGS. 5A to 5C are graphs of the light intensity distributions of the projected light spot by the light projecting system of a preferred embodiment the present invention. FIGS. 5A, 5B and 5C represent the light intensity distributions of the projected light spot when the positions of the object are 4m, 2m and 1m, respectively.

Figure 6A:
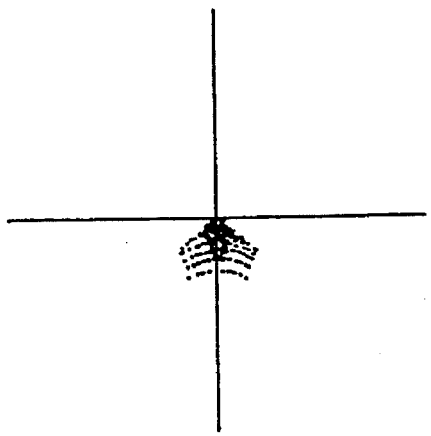
FIGS. 6A to 6C are graphs representing the light intensity distributions of a projected light spot in the light projecting system of a preferred embodiment of the present invention, when the position of the light emission source is not moved (δ=0).
Figure 6B:
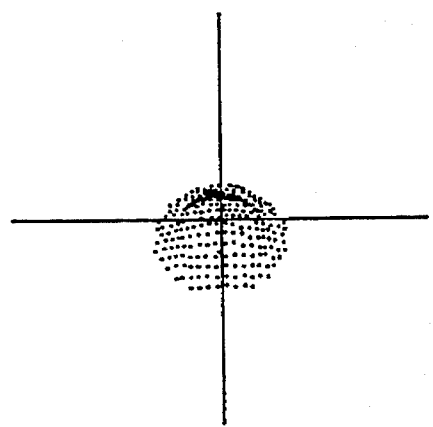
Figure 6C:
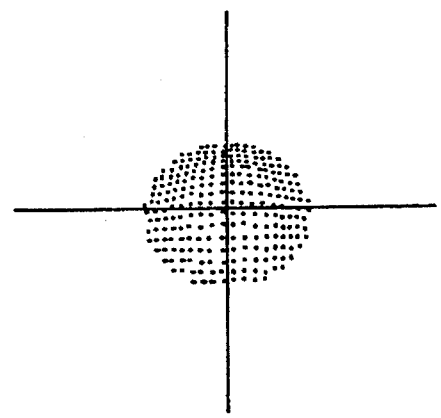

FIGS. 6A to 6C are graphs of the light intensity distributions of the projected light spot in the light projecting system of a preferred embodiment the present invention, when the position of the light emission source is not moved ($\delta=0$). FIGS. 6A, 6B and 6C represent the light intensity distributions of the projected light spot when the positions of the object are 4m, 2m and 1m, respectively.

Figure 7A:
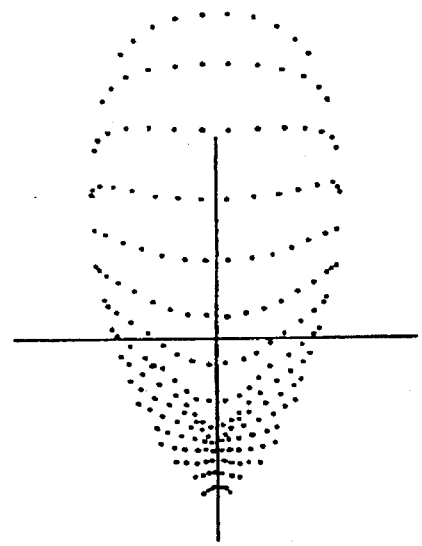
FIGS. 7A to 7C are graphs representing the light intensity distributions of the projected light spot when in the light projecting system of a preferred embodiment of the present invention, when the position of the light emission source is moved by a predetermined amount, but the eccentricity of the projected light spot resulting from this movement is not corrected by the light projecting lens.
Figure 7B:
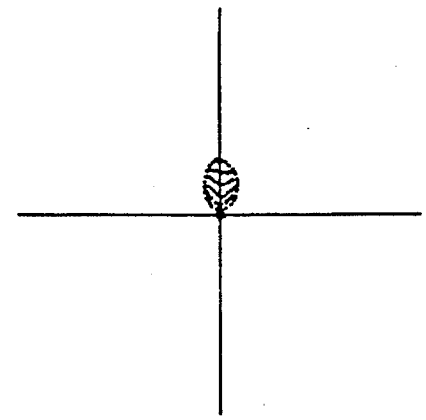
Figure 7C:
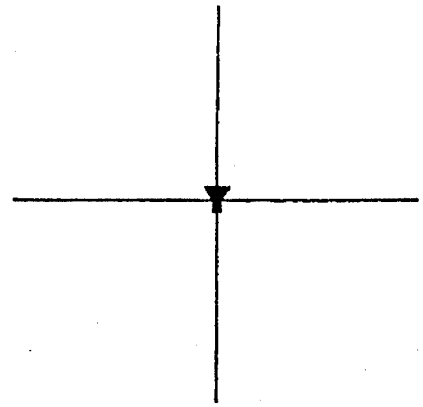
Figure 8A:
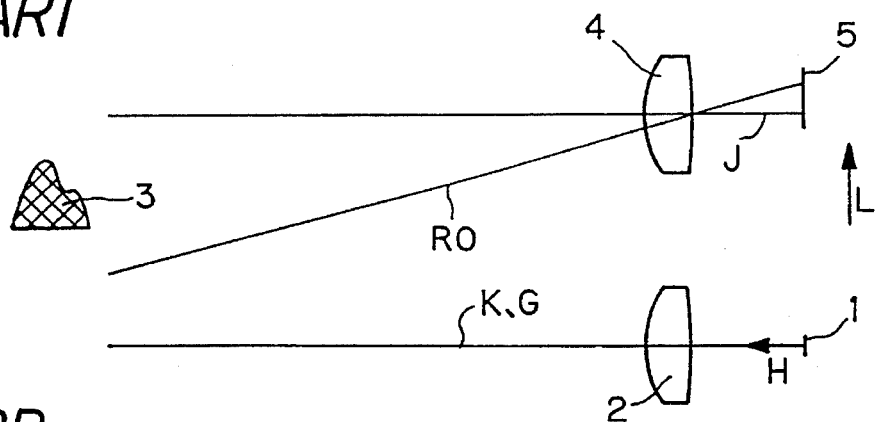
FIGS. 8A and 8B are diagrams of cross-sectional views of the optical arrangement of a focus detecting optical system of the active type according to the prior art.
Figure 8B:
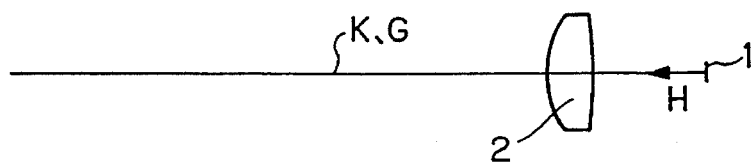
Figure 9:
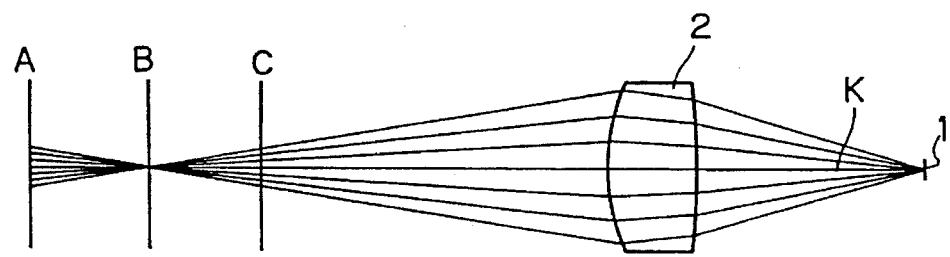
FIG. 9 is a diagram of the optical path of a beam of light emitted from a light emission source 1 in the prior art light projecting system of FIGS. 8A and 8B.
Figures 10A, 10B, 10C:
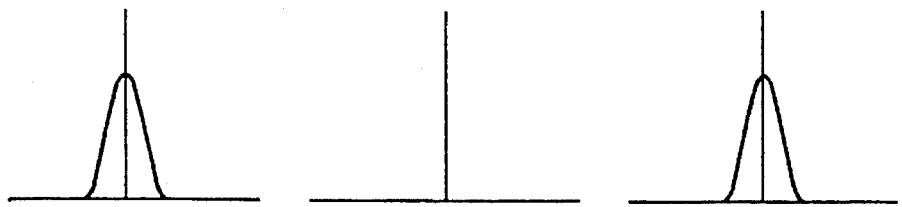
FIGS. 10A to 10C are graphs of the light intensity distributions in the direction of a base length at the positions A, B and C, respectively, of FIG. 9.
Figure 11:
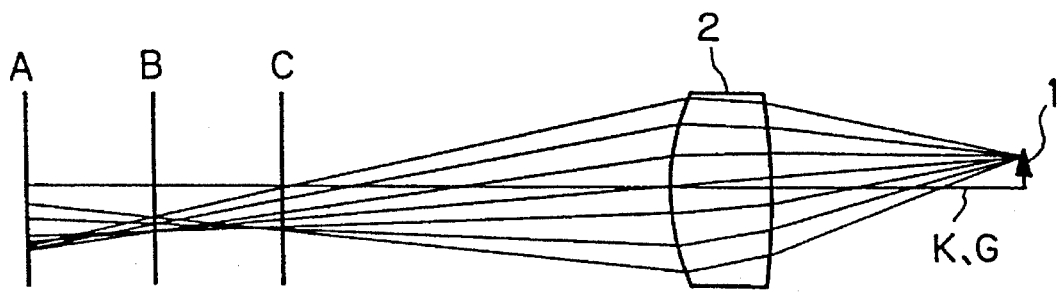
FIG. 11 is a diagram of the state in which the centroidal position of a projected light spot deviates from the center of the outer diameter of the lens depending on the positions A, B and C of an object.
Figure 12:
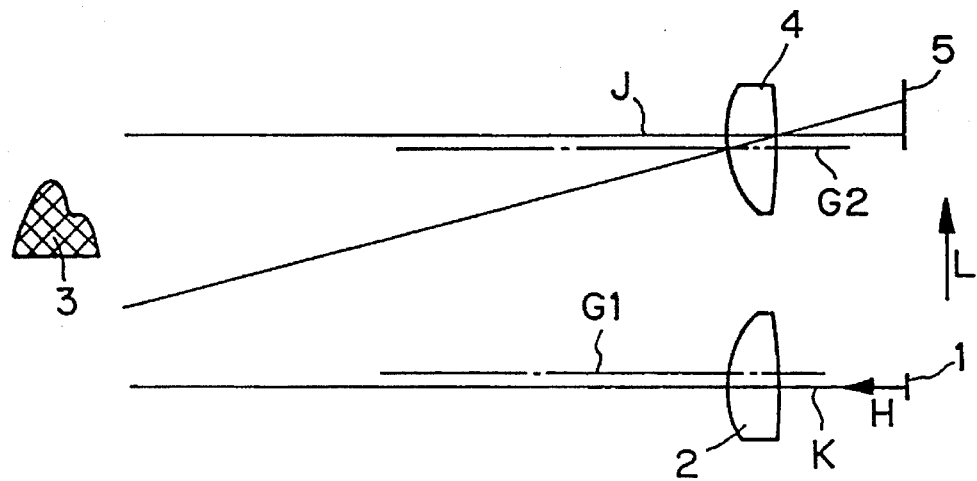
FIG. 12 is a diagram of a cross-sectional view in the direction of the base length showing the optical arrangement of the focus detecting optical system of the active type according to the prior art in which the center of the outer diameter of a light projecting lens is moved by a predetermined distance along the direction of the base length relative to the optical axis of the light projecting lens and a light emission source.
Figure 13:
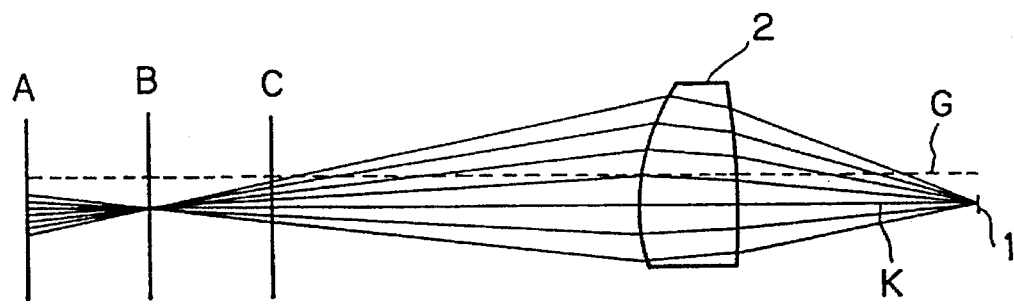
FIG. 13 is a diagram of the optical path of a beam of light emitted from the light emission source 1 in the light projecting system of FIG. 12.
Figure 14A:
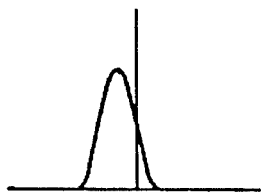
FIGS. 14A to 14C are graphs of the light intensity distributions in the direction of the base length at the positions A, B and C, respectively, of FIG. 13.
Figure 14B:
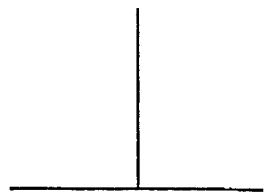
Figure 14C:
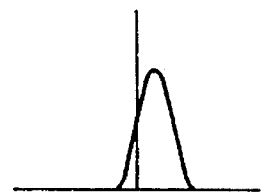

FIGS. 7A to 7C are graphs of the light intensity distributions of the projected light spot in the light projecting system of a preferred embodiment of the present invention, when the position of the light emission source is moved by a predetermined amount but the eccentricity of the projected light spot resulting from this movement is not corrected by the light projecting lens,. FIGS. 7A, 7B and 7C represent the

TABLE 2

(Light Projecting System)

| | r | d | n | |
|---|---|---|---|---|
| 0 | ∞ | 12.90 | | (IRED) |
| 1 | 559.9000 | 4.00 | 1.48423 | (light projecting lens) |
| 2* | −7.5922 | | | |

(Aspherical Surface Data)

| | k | $C_2$ | $C_4$ |
|---|---|---|---|
| 2nd surface | 0.6662 | 0.0000 | $0.78781 \times 10^{-6}$ |

| | $C_6$ | $C_8$ | $C_{10}$ |
|---|---|---|---|
| | $0.52652 \times 10^{-8}$ | $0.13717 \times 10^{-10}$ | $0.24369 \times 10^{-11}$ |

(Other Dimensional Parameters)

The outer diametral shape of the light projecting lens 2 is a cylindrical shape of a diameter 13 mm, and
$\Delta 1 = 0$
$\Delta 2 = -0.5$ mm
$\delta = -1.5$ mm
$\alpha = -0.7°$
$\beta = 7°$ (Light Receiving System)

| | r | d | n | |
|---|---|---|---|---|
| 1* | 7.5922 | 4.00 | 1.48423 | (light receiving lens) |
| 2 | −559.9000 | 12.90 | | |

(Aspherical Surface Data)

| | k | $C_2$ | $C_4$ |
|---|---|---|---|
| 1st surface | 0.6662 | 0.0000 | $-0.78781 \times 10^{-6}$ |

| | $C_6$ | $C_8$ | $C_{10}$ |
|---|---|---|---|
| | $-0.52652 \times 10^{-8}$ | $-0.13717 \times 10^{-10}$ | $-0.24369 \times 10^{-11}$ |

(Condition-Corresponding Values)

$|\tan\beta| = 0.123$
$|\delta|/Bf = 0.116$
$|\tan\beta|/(|\delta|/Bf) = 1.060$ light intensity distributions of the projected light spot when the positions of the object are 4m, 2m and 1m, respectively.

In FIGS. 5A to 7C, the axis of abscissas corresponds to the direction L of the base length and the axis of ordinates corresponds to the direction M orthogonal to the direction of the base length.

As is apparent from the comparison of FIGS. 6A to 6C and FIGS. 7A to 7C which are the results of comparative examples with FIGS. 5A to 5C which are the results of Embodiment 2, according to the focus detecting optical system according to the present invention, the centroidal position of the projected light spot is substantially constant for the object which is at a distance of 1m to 4m. Accordingly, it will be seen that distance measurement can be effected with good accuracy by the use of the focus detecting optical system according to the present invention and as a result, the focus position can be detected with good accuracy.

In the above-described preferred embodiments, the light-projecting lens and the light receiving lens each are comprised of a lens, but it is apparent that each of them may be comprised of a plurality of lenses.

As described above, according to the present invention, there can be realized a focus detecting optical system of the active type which is capable of effecting good focus detection and enables the space to be effectively used.

What is claimed is:

1. A focus detecting optical system comprising:

a light source;

a light projecting system having a light projecting lens through which a beam of light emitted from said light source is applied to an object; and a light receiving system for receiving a reflected beam of light from the object;

said light source and an optical center of at least one lens surface of the light projecting lens of said light projecting system are positioned apart from each other and off-axis from a structural center axis of the light projecting lens of said light projecting system.

2. A focus detecting optical system comprising:

a light source;

a light projecting system having a light projecting lens through which a beam of light emitted from said light source is applied to an object; and a light receiving system for receiving a reflected beam of light from the object;

said light source is positioned eccentrically by a first predetermined distance from a structural center axis of the light projecting lens of said light projecting system, and an optical center of at least one lens surface of the light projecting lens of said light projecting system is positioned apart by a second predetermined distance from the structural center axis of the light projecting lens of said light projecting system so as to correct a fluctuation of a centroidal position of a projected light spot relative to an optical axis of said light projecting system which is attributable to an eccentricity of said light source.

3. A focus detecting optical system comprising:

a light source;

a light projecting system for applying a beam of light emitted from said light source to an object through a light projecting lens; and a light receiving system for condensing a reflected beam of light from the object on a light receiving element through a light receiving lens;

wherein said focus detecting optical system is designed to measure a distance to the object on the basis of a change in an imaged position on the light receiving element of said light receiving system to thereby detect a focus position, and said light source and the paraxial curvature center position of at least one lens surface of the light projecting lens of said light projecting system are positioned apart from each other and from a center axis of an outer diameter of the light projecting lens in a direction orthogonal to the direction of a base length.

4. A focus detecting optical system comprising:

a light source;

a light projecting system for applying a beam of light emitted from said light source to an object through a light projecting lens; and a light receiving system for condensing a reflected beam of light from the object on a light receiving element through a light receiving lens;

wherein said focus detecting optical system is designed to measure a distance to the object on the basis of a change in an imaged position on the light receiving element of said light receiving system to thereby detect a focus position, and said light source is positioned while being eccentric by a first predetermined distance from a center axis of an outer diameter of the light projecting lens of said light projecting system in a direction orthogonal to the direction of a base length, and the paraxial curvature center position of at least one lens surface of the light projecting lens of said light projecting system is positioned apart by a second predetermined distance from the center axis of the outer diameter of the light projecting lens in the direction orthogonal to the direction of the base length so as to correct a fluctuation of a centroidal position of a projected light spot relative to the center axis of the outer diameter of the light projecting lens which is attributable to an eccentricity of said light source.

5. The focus detecting optical system of claim 4, wherein the normal to a light emitting surface of said light source is inclined by a predetermined angle with respect to the center axis of the outer diameter of the light projecting lens of said light projecting system so that a quantity of light applied from said light source to the light projecting lens may not become substantially small relative to a quantity of light emitted from said light source.

6. The focus detecting optical system of claim 4, wherein the lens surface, of the light projecting lens of said light projecting system, which is most adjacent to a object side is an aspherical surface, and a rotational optical axis of the lens surface which is most adjacent to the object side is positioned with eccentricity from the center axis of the outer diameter of the light projecting lens in the direction orthogonal to the direction of the base length.

7. The focus detecting optical system of claim 4, wherein the optical axis of the light projecting lens is positioned in parallelism to the direction orthogonal to the direction of the base length relative to the center axis of the outer diameter of the light projecting lens.

8. The focus detecting optical system of claim 4, wherein when an on-axis spacing between said light source and the lens surface of the light projecting lens which is most adjacent to the light source is Bf and an amount of deviation of said light source from the center axis of the outer diameter of the light projecting lens is $\delta$ and an angle formed between the normal to the light emitting surface of said light source and the center axis of the outer diameter of the light projecting lens is $\beta$, the following condition is established:

$$0.5 < |\tan \beta|/(|\delta|/Bf) < 2.$$

* * * * *